(12) United States Patent
Cheng et al.

(10) Patent No.: US 8,414,269 B2
(45) Date of Patent: Apr. 9, 2013

(54) TURBINE COMPONENT TRAILING EDGE AND PLATFORM RESTORATION BY LASER CLADDING

(75) Inventors: Kenny Cheng, Singapore (SG); Siew Kong Lee, Singapore (SG); Eng Thong Ong, Singapore (SG)

(73) Assignee: United Technologies Corporation, Hartford, CT (US)

( * ) Notice: Subject to any disclaimer, the term of this patent is extended or adjusted under 35 U.S.C. 154(b) by 1796 days.

(21) Appl. No.: 11/435,950

(22) Filed: May 17, 2006

(65) Prior Publication Data

US 2007/0160476 A1 Jul. 12, 2007

(51) Int. Cl.
*F01D 5/14* (2006.01)

(52) U.S. Cl.
USPC .................................. 416/229 A; 416/241 R

(58) Field of Classification Search ............... 416/229 R, 416/229 A, 241 R; 415/200
See application file for complete search history.

(56) References Cited

U.S. PATENT DOCUMENTS

| | | | | |
|---|---|---|---|---|
| 5,038,014 | A | * | 8/1991 | Pratt et al. ................. 219/121.64 |
| 5,142,778 | A | | 9/1992 | Smolinski |
| 6,154,959 | A | * | 12/2000 | Goodwater et al. ......... 29/889.1 |
| 6,269,540 | B1 | * | 8/2001 | Islam et al. .................. 29/889.7 |
| 6,364,971 | B1 | * | 4/2002 | Peterson et al. ............. 148/525 |
| 6,673,169 | B1 | * | 1/2004 | Peterson et al. ............. 148/524 |
| 7,009,137 | B2 | * | 3/2006 | Guo .......................... 219/121.64 |
| 2004/0086635 | A1 | * | 5/2004 | Grossklaus, Jr. et al. ..... 427/140 |
| 2004/0191064 | A1 | * | 9/2004 | Guo .............................. 416/191 |
| 2005/0132569 | A1 | * | 6/2005 | Clark et al. ............... 29/888.041 |
| 2005/0178750 | A1 | * | 8/2005 | Cheng et al. ............. 219/121.64 |
| 2007/0163115 | A1 | * | 7/2007 | Cheng et al. ................ 29/889.2 |

FOREIGN PATENT DOCUMENTS

| | | |
|---|---|---|
| EP | 0504095 | 9/1992 |
| EP | 1207004 | 5/2002 |
| EP | 1249300 | 10/2002 |
| EP | 1563945 | 8/2005 |
| JP | 59110778 | 6/1984 |

OTHER PUBLICATIONS

European Search Report dated May 15, 2007.

* cited by examiner

*Primary Examiner* — Edward Look
*Assistant Examiner* — Aaron R Eastman
(74) *Attorney, Agent, or Firm* — Carlson, Gaskey & Olds

(57) ABSTRACT

A method of restoring a gas turbine engine component includes depositing a filler material onto a sulphidation section of an underside of a turbine engine platform and laser consolidating the filler material to produce a restored surface on the underside. The sulphidation section includes sulphidation pit portions that are filled during the laser consolidating to produce the restored surface. An eroded trailing edge of a turbine airfoil is laser cladded to produce a restored trailing edge thickness.

18 Claims, 3 Drawing Sheets

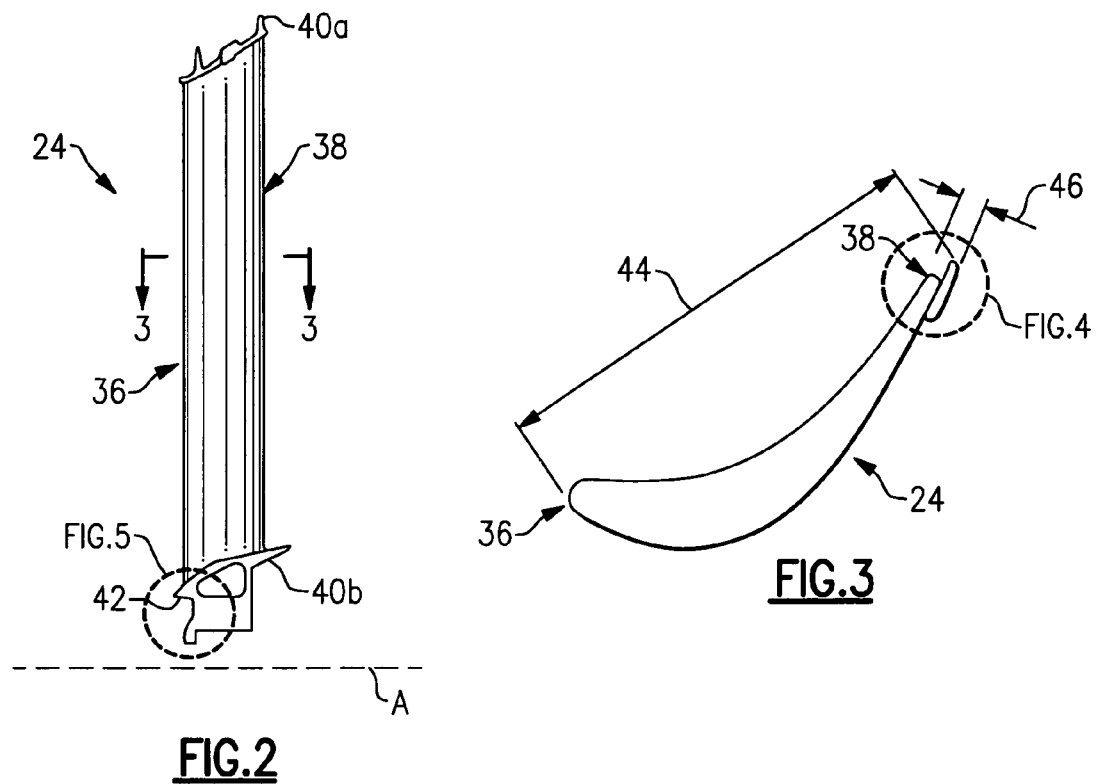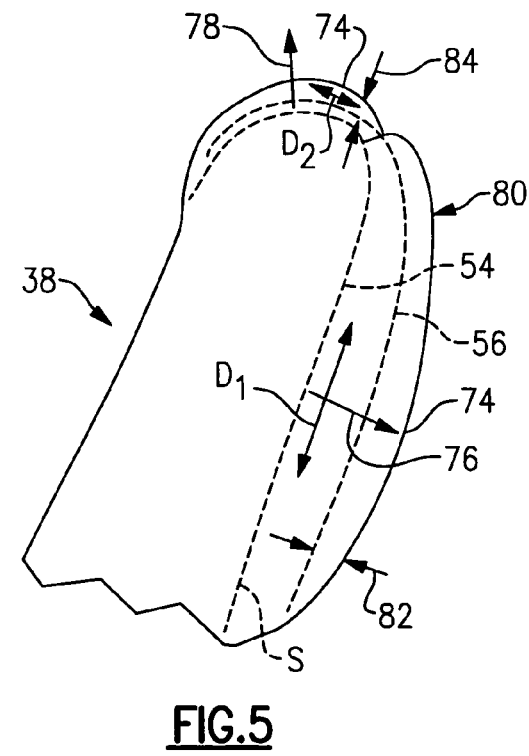

TURBINE COMPONENT TRAILING EDGE AND PLATFORM RESTORATION BY LASER CLADDING

RELATED APPLICATIONS

This application claims priority to Singapore Application No. 200600243-0, filed Jan. 16, 2006.

BACKGROUND OF THE INVENTION

This invention relates to repair of gas turbine engine components and, more particularly, to a method for restoring a sulphidation section of a turbine airfoil platform and an eroded turbine airfoil trailing edge.

Conventional gas turbine engines typically include turbine sections having an alternating arrangement of rotating turbine blades and static turbine vanes. A flow of hot gases from a combustor section expands against the turbine blades and vanes to rotationally drive the turbine blades, which are coupled to an engine main shaft that drives a compressor section.

During engine operation, the hot gases produce a corrosive environment that corrosively attacks the surfaces of the blades and vanes and often results in corrosive pitting in platforms that support the blades and vanes. Furthermore, the hot gases, soot from combustion, and particles within the flow of hot gases, wear against and erode the blades, vanes, and other turbine engine components, which often changes the originally designed dimensions. Turbine vanes, for example, are formed in the shape of an airfoil and include a leading edge and a trailing edge that define a chordwidth there between. An aspect ratio between the chordwidth and a thickness of the airfoil determines the aerodynamic efficiency of the turbine vane. Disadvantageously, the trailing edge of the turbine vane is susceptible to wear and erosion. As the trailing edge erodes, the length of the chordwidth dimension of the turbine vane decreases. Thus, the aspect ratio between the chordwidth and the airfoil thickness decreases, thereby decreasing the aerodynamic efficiency of the turbine vane.

Conventional engine component repair techniques have been adapted to repair component microcracks, from fatigue for example, but are undesirable for several reasons. One conventional repair method includes brazing the engine component to repair the microcracks. Typically, brazing includes heating the engine component or relatively large zone of the engine component at high temperatures to melt a braze filler to fill the microcracks. The high temperatures may result in undesirable residual thermal stress in the engine component and undesirable changes in the metallic microstructure of the repaired areas.

Accordingly, there is a need for a method of restoring a turbine airfoil and platform of an engine component to an original shape to prolong the useful life of the engine component without inducing high levels of residual stress in the engine component.

SUMMARY OF THE INVENTION

A method of restoring a gas turbine engine component according to the present invention includes depositing a filler material onto a sulphidation section of the turbine engine component and laser consolidating the filler material to produce a restored surface. In one example, the sulphidation section includes sulphidation pits that are filled during the laser consolidating to produce the restored surface.

Another exemplary method of restoring a gas turbine engine component according to the present invention includes depositing a laser cladding on an eroded trailing edge of a turbine airfoil to produce a restored trailing edge thickness. This includes depositing the laser cladding to produce an oversized trailing edge thickness and then machining down the oversized trailing edge thickness to produce the restored trailing edge thickness. In one example, the eroded trailing edge is abraded to clean away oxidation and contamination before laser cladding.

Accordingly, the disclosed examples provide methods of restoring a turbine airfoil and platform of an engine component to an original shape to prolong the useful life of the engine component without inducing high levels of residual stress in the engine component.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 2 shows example turbine vane and platforms.

FIG. 3 shows a cross-section of the turbine vane shown in FIG. 2.

FIG. 4 shows an eroded trailing edge of the turbine vane shown in FIG. 3.

FIG. 5 shows rebuilding the trailing edge to produce an oversized cladded portion that is then machined down to produce a restored trailing edge.

DETAILED DESCRIPTION OF THE PREFERRED EMBODIMENT

Figure 1:
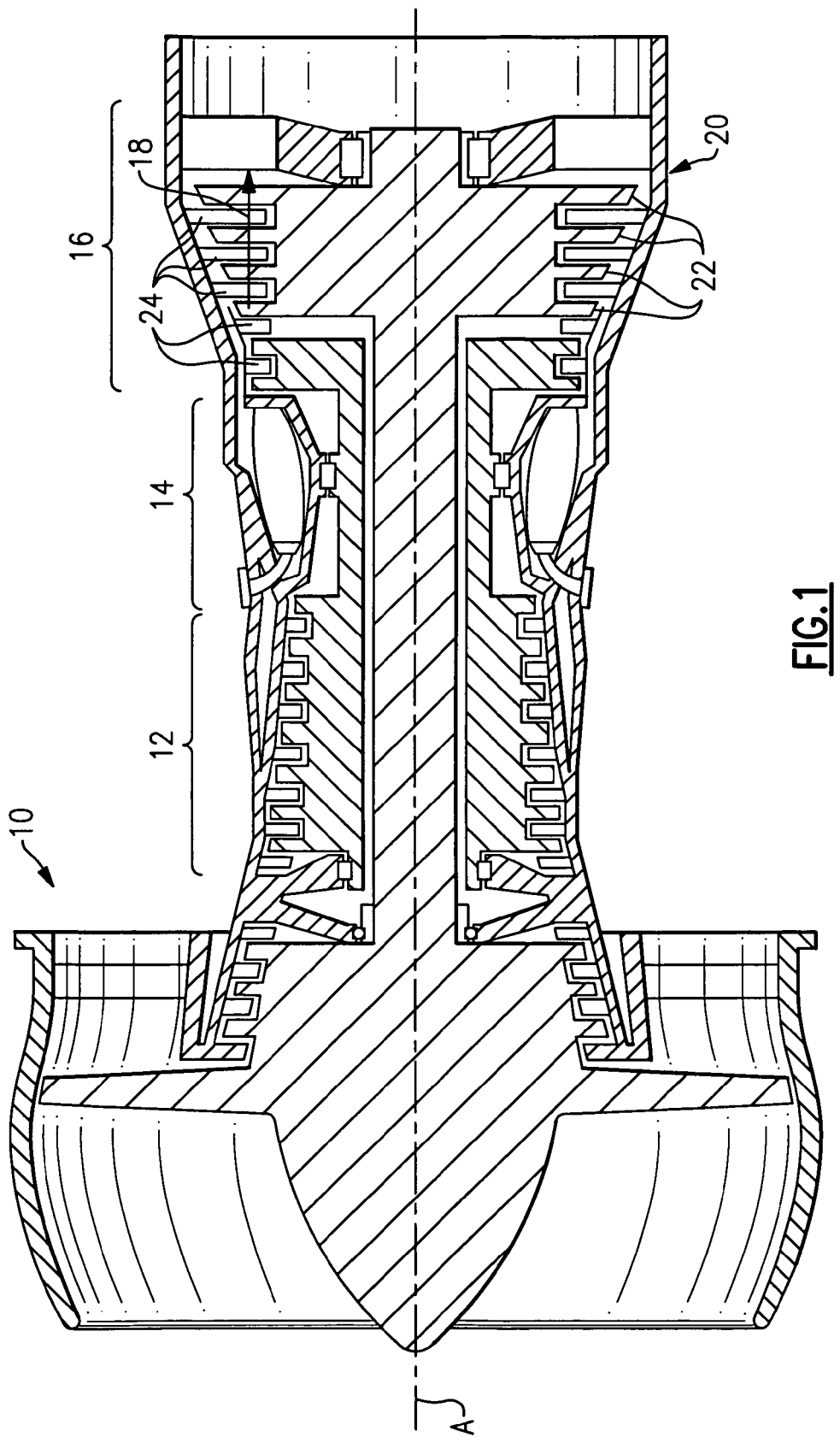
FIG. 1 shows an example combustion engine.

FIG. 1 illustrates selected portions of an example combustion engine 10, such as a gas turbine engine for an aircraft. In this example, the combustion engine 10 includes a compressor section 12, a combustor section 14, and a turbine section 16. The combustion engine 10 operates in a known manner, feeding compressed air or oxidizer from the compressor section 12 to the combustor section 14. The compressed air or oxidizer is mixed with fuel and reacts to produce a flow of hot gases 18. The turbine section 16 transforms the flow of hot gases 18 into mechanical energy to drive the compressor section 12. An exhaust nozzle 20 directs the hot gases 18 out of the combustion engine 10 to provide thrust to the aircraft or other vehicle.

In the illustrated example, the turbine section 16 includes alternating rows of rotary airfoils or blades 22 and static airfoils or vanes 24. The vanes 24 are arranged in various stages, such a first stage, a second stage, a third stage, a fourth stage, etc. The blades 22 and vanes 24 are formed from a superalloy metal material, such as a cobalt or nickel superalloy in a casting, forging, or other known manufacturing process.

Referring to FIG. 2, the vane 24 is fused to corresponding platforms 40a and 40b that support the vane 24 in the combustion engine 10 in a known manner. The platform 40a supports a radially outer portion of the vane 24 and the platform 40b supports a radially inward portion of the vane 24.

The vane 24 includes a leading edge 36 and a trailing edge 38. The leading edge 36 is generally located toward the combustor section 14 and the trailing edge 38 is generally located toward the exhaust nozzle 20 in the combustion engine 10 (FIG. 1).

In this example, the trailing edge 38 has been eroded during operation of the combustion engine 10, which has resulted in a trailing edge 38 thickness that is less than a threshold thickness, such as designated by a design manual of the vane 24. Additionally, an underside 42 of the platform that faces radially inward relative to a central axis A of the combustion engine 10 has been corroded by the relatively severe environment of the flow of hot gases 18 through the turbine section 16. The trailing edge 38 and underside 42 are repaired as described below to prolong the life of the vane 24 and platforms 40a and 40b.

Referring to the vane 24 cross-section shown in FIG. 3, the leading edge 36 and the trailing edge 38 define a chordwidth 44 of the vane 24. A thickness dimension 46 is transverse to the chordwidth 44. In the illustrated example, an aspect ratio of the chordwidth 44 to the thickness 46 at least partially determines an aerodynamic efficiency of the vane 24. That is, a relatively larger aspect ratio corresponds to a greater aerodynamic efficiency, while a relatively smaller aspect ratio corresponds to a lesser aerodynamic efficiency.

FIG. 4 shows a more detailed view of the section shown in FIG. 3. In the illustrated example, the dotted line 54 represents an eroded surface of the trailing edge 38. In one example, the eroded surface 54 is the result of field operation of the combustion engine 10. A solid line 56 represents an original surface of the trailing edge 38. The original surface 56 refers to a shape and dimension of the trailing edge 38 before erosion. Thus, the original surface 56 may be the as-cast or as-forged condition of the trailing edge 38 of a newly manufactured vane 24. Alternatively, the original surface 56 is the as-designed dimension of the trailing edge 38 as found in a combustion engine 10 design manual.

Over time, the friction of hot gases 18 from the combustor section 14, soot, or particles in the hot gas flow 18 erode away the original surface 56 to produce the eroded surface 54. The erosion reduces the chordwidth 44 dimension by an amount 58 and the thickness dimension 46 by an amount 60, which reduces the aerodynamic efficiency of the vane 24 as described above. If the chordwidth 44 and thickness 46 are, respectively, less than a threshold chordwidth or threshold thickness, it is desirable to repair the trailing edge 38. In one example, the thresholds are called out in a design manual of the vane 24.

Laser cladding is used to repair the eroded surface 54 of the trailing edge 38, as described below. To repair the trailing edge 38, the eroded surface 54 is abraded to remove loose portions, oxidation, and contaminants. In one example, the abrading includes lightly polishing the eroded surface 54 manually.

As shown in FIG. 5, after abrading the eroded surface 54, a filler material 74 is deposited onto the eroded surface 54 in a known manner as a powder or other type of filler material to gradually build-up (as indicated by the arrow 76) the thickness 46 of the trailing edge 38. The filler material 74 is deposited along a direction $D_1$ on a suction side S of the vane 24. The filler material 74 is also deposited onto the eroded surface 54 along a direction $D_2$ (transverse to $D_1$) to gradually build-up (as indicated by the arrow 78) the chordwidth 44 of the vane 24.

In one example, the filler material 74 is of a similar composition to the superalloy used to originally form the vane 24 to promote a strong bond between the cladding and the original superalloy of the vane 24. In another example, the filler material is a composition according to the standard set forth in AMS 5837.

As the filler material 74 is deposited, a laser consolidates (i.e., melts and fuses) the filler material 74 in a known manner. The melting and fusing of the filler material 74 is relatively rapid and accurate, which provides the benefit of a fast vane 24 repair cycle time and a high degree of repeatability. Furthermore, laser cladding melts and fuses a relatively small trailing edge 38 and filler material 74 volume to minimize the size of the heat affected zone of the trailing edge, which is a drawback of prior art brazing and welding that result in relatively large heat affected zones.

The consolidated filler material 74 builds-up on the trailing edge 38 to form an oversized cladded portion 80 that is bonded to the original superalloy material at the eroded surface 54 of the vane 24. The oversized cladded portion 80 is larger than the original surface 56 in the thickness 46 dimension by an amount 82 and larger than the chordwidth dimension 44 by an amount 84. This provides the benefit of ensuring that trailing edge 38 is built-up enough to completely restore the chordwidth 44 and thickness 46 dimensions to the original airfoil shape.

After the oversized cladded portion 80 is deposited on the trailing edge 38, the oversized cladded portion 80 is machined to the chordwidth 44 and thickness 46 dimensions of the original surface 56. In one example, the machining includes known grinding, grit blasting, polishing, or other known machining method to provide a smooth transition area from the laser cladding to the original, non-repaired portions of the vane 24.

Figure 6:
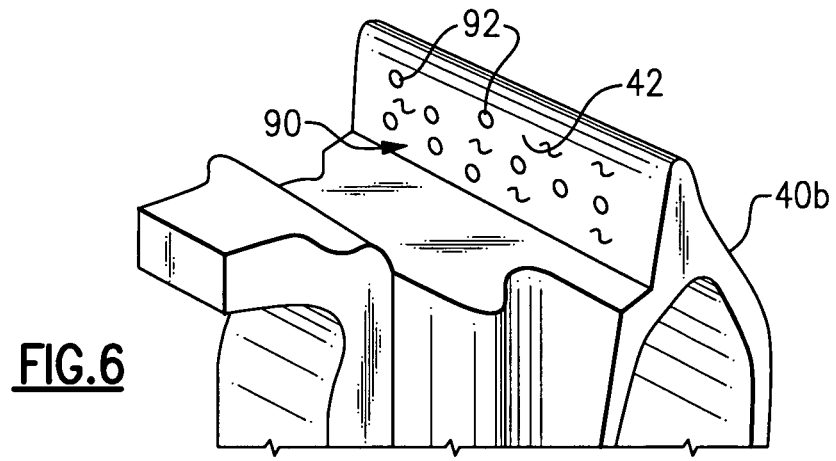
FIG. 6 shows the sulphidation corrosion on an underside of a platform that supports the vane.

Referring to the perspective view of the platform 40b shown in FIG. 6, the underside 42 includes a sulphidation section 90 having sulphidation pits 92, also known as dimples, that extend into the underside 42 surface. The sulphidation pits 92 are a result of corrosive attack, also known as hot corrosion, which is usually caused by sulphates such as $Na_2SO_4$ and other contaminants in the hot gas 18.

To restore the underside 42 of the platform 40b, the sulphidation section 90 is cleaned to remove oxides and other surface contaminants. The cleaning includes abrading the sulphidation section 90 by grinding, grit blasting, polishing, or other known method. In one example, a carbide tip abrasion tool is used to manually abrade the sulphidation section 90.

In one example of the cleaning, the abrading does not remove the sulphidation pits 92, but does reduce the depth of the sulphidation pits 92. In another example of the cleaning, the cleaning completely removes the sulphidation pits 92 to produce a sulphidation section 90 without sulphidation pits 92.

Figure 7:
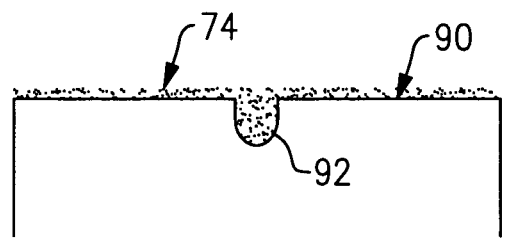
FIG. 7 shows depositing a filler material on a sulphidation section of the underside of the vane to fill sulphidation pits.

Referring to FIG. 7, after cleaning, filler material 74 is deposited on the sulphidation section 90 in a manner similar to as described above for laser cladding of the trailing edge 38. As the filler material 74 is deposited, a laser consolidates (i.e., melts and fuses) the filler material 74. The melting and fusing of the filler material 74 is relatively rapid and accurate, which provides the benefit of a fast platform 40b repair cycle time and a high degree of repeatability.

Figure 8:
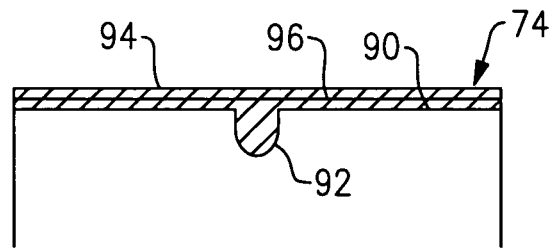
FIG. 8 shows an oversized laser cladding consolidated on the sulphidation section of FIG. 7.
Figure 9:
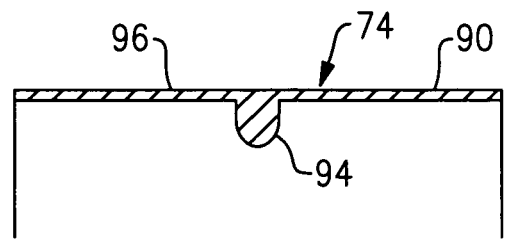
FIG. 9 shows the oversized laser cladded portion that has been machined down to the original dimensions of the underside of the platform.

Referring to FIG. 8, the consolidated filler material 74 builds-up on the sulphidation section 90 to form an oversized cladded portion 94 that fills the sulphidation pits 92 and fuses to the original superalloy material of the sulphidation section 90. The oversized cladded portion 94 is larger than an original surface dimension (indicated at 96) of the underside 42 to ensure that there is enough laser cladding to completely restore the original dimensions and shape of the underside 42. The oversized cladded portion 94 is then machined to the original surface dimension 96 (FIG. 9) in a known manner and provides a smooth transition area from the laser cladding to the original, non-repaired portions of the platform 40*b*.

The above examples disclose a method for restoring the vane 24, or other turbine component. The trailing edge 38 of the vane 24 is eroded away during operation of the combustion engine 10, which reduces the aerodynamic efficiency of the turbine vane 24. The eroded portion of the trailing edge 38 is cleaned and laser cladding is used to rebuild the trailing edge 38. Thus, the chordwidth 44 and thickness 46 dimensions of the vane 24 are restored to near original dimensions to increase the aerodynamic efficiency of the vane 24 and extend the life of the vane 24. Furthermore, the sulphidation section 90 of the underside 42 of the platform 40*b* is cleaned and laser cladded to restore the original dimensions and shape of the platform 40*b*.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of restoring a gas turbine engine component, including the steps of:
    (a) depositing a filler material onto sulphidation pit portions of a sulphidation section of a turbine engine component; and
    (b) laser consolidating the filler material to produce a restored surface.

2. The method as recited in claim 1, including step (c) cleaning the sulphidation section before step (b).

3. The method as recited in claim 2, wherein step (c) comprises abrading the sulphidation section.

4. The method of claim 1, wherein the sulphidation section is a turbine platform surface that faces in a radially inward direction relative to a turbine engine central axis.

5. The method of claim 4, wherein step (b) includes laser consolidating the filler material to produce an oversized platform thickness that is greater than a restored platform thickness.

6. The method of claim 5, including step (c) machining the oversized platform thickness to produce the restored platform thickness.

7. A gas turbine engine including a compressor section, a combustion section, a turbine section, and a gas turbine engine component comprising:
    a turbine airfoil platform including a sulphidation section having sulphidation pits;
    a restored platform surface that includes a laser cladding portion bonded to said sulphidation section such that the laser cladding portion fills the sulphidation pits and
    wherein the turbine section having has a turbine airfoil restored according to the method recited in claim 1.

8. The method as recited in claim 1, further including, prior to step (a), cleaning the sulphidation section to reduce a depth of sulphidation pits to thereby form the sulphidation pit portions.

9. A method of restoring a gas turbine engine component, including the steps of:
    (a) depositing a laser cladding on an eroded trailing edge of a turbine airfoil; and
    (b) producing a restored trailing edge thickness.

10. The method of claim 9, further including the step of producing an oversized trailing edge thickness that is greater than the restored trailing edge thickness.

11. The method of claim 10, wherein step (b) further includes the step of machining the oversized trailing edge thickness to produce the restored trailing edge thickness.

12. The method of claim 9, including depositing the laser cladding in step (a) along a first direction to produce the restored trailing edge thickness and further including the step of depositing a second laser cladding along a second direction that is transverse to the first direction to produce a restored chordwidth dimension of the turbine airfoil.

13. The method of claim 9, further including the step of determining whether a thickness of the eroded trailing edge is less than a threshold trailing edge thickness and depositing the laser cladding on the eroded trailing edge in response to the thickness of the eroded trailing edge being less than the threshold trailing edge thickness.

14. The method of claim 9, wherein the turbine airfoil of step (a) includes a corresponding platform, and further including the step of depositing a filler material onto a sulphidation section of the platform and laser consolidating the filler material to produce a restored surface on the platform.

15. A gas turbine engine component comprising:
    a turbine airfoil platform including a sulphidation section having sulphidation pits;
    a restored platform surface that includes a laser cladding portion bonded to said sulphidation section such that the laser cladding portion fills the sulphidation pits.

16. The component of claim 15, wherein the sulphidation section comprises an original superalloy portion bonded to the laser cladding portion.

17. The component of claim 15, including a turbine airfoil having a leading edge and a trailing edge, said trailing edge having a second laser cladding portion that comprises at least a portion of a chordwidth dimension of said turbine airfoil.

18. A gas turbine engine including a compressor section, a combustion section, and a turbine section, said turbine section including said turbine platform as recited in claim 15.

* * * * *